US009033790B2

(12) United States Patent
Kim et al.

(10) Patent No.: US 9,033,790 B2
(45) Date of Patent: May 19, 2015

(54) GAME ITEM AUCTION

(71) Applicant: Empire Technology Development LLC, Wilmington, DE (US)

(72) Inventors: Seungil Kim, Seoul (KR); Youngil Ko, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 11 days.

(21) Appl. No.: 13/882,493

(22) PCT Filed: Dec. 7, 2012

(86) PCT No.: PCT/US2012/068460
§ 371 (c)(1),
(2) Date: Apr. 29, 2013

(87) PCT Pub. No.: WO2014/088591
PCT Pub. Date: Jun. 12, 2014

(65) Prior Publication Data
US 2014/0162763 A1 Jun. 12, 2014

(51) Int. Cl.
*G06F 17/00* (2006.01)
*A63F 13/30* (2014.01)
*A63F 13/40* (2014.01)
*A63F 13/67* (2014.01)
*A63F 13/58* (2014.01)

(52) U.S. Cl.
CPC .................. *A63F 13/12* (2013.01); *A63F 13/10* (2013.01); *A63F 2300/575* (2013.01); *A63F 13/67* (2014.09); *A63F 13/58* (2014.09)

(58) Field of Classification Search
CPC ....................................................... A63F 13/12
USPC ....................................................... 463/16–25
See application file for complete search history.

(56) References Cited

U.S. PATENT DOCUMENTS

| | | | |
|---|---|---|---|
| 8,298,087 B1 | 10/2012 | Smith | |
| 8,662,975 B1 * | 3/2014 | Wieczorek | 463/9 |
| 2003/0225777 A1 * | 12/2003 | Marsh | 707/101 |
| 2004/0177025 A1 * | 9/2004 | Spoonhower et al. | 705/37 |
| 2005/0187023 A1 * | 8/2005 | Miyamoto et al. | 463/43 |
| 2007/0078849 A1 * | 4/2007 | Slothouber | 707/5 |
| 2009/0318221 A1 * | 12/2009 | Dhunjishaw et al. | 463/29 |
| 2011/0212784 A1 | 9/2011 | Ocko et al. | |
| 2011/0300923 A1 | 12/2011 | Van Luchene | |
| 2012/0238357 A1 | 9/2012 | Yamamoto et al. | |
| 2012/0302354 A1 | 11/2012 | Thakkar et al. | |
| 2014/0214903 A1 * | 7/2014 | Stivoric et al. | 707/803 |

OTHER PUBLICATIONS

International Search Report from International Application No. PCT/US12/68460 mailed Feb. 14, 2013.

* cited by examiner

*Primary Examiner* — Ronald Laneau
(74) *Attorney, Agent, or Firm* — Brundidge & Stanger, P.C.

(57) ABSTRACT

Technologies are generally described for an auction in a game. In some examples, an item auction system may include a playing pattern analysis unit configured to analyze a playing pattern of a player of a particular game, a character level prediction unit configured to predict level advancement for a game character of the player based at least in part on the analyzed playing pattern, and an item recommendation unit configured to recommend one or more game items to the player from among multiple game items in one or more auctions based at least in part on the predicted level advancement and time remaining in respective ones of the one or more auctions.

17 Claims, 7 Drawing Sheets

FIG. 4

Item Search Condition

| Item Type | Required Level | Min. Strength | Min. Vitality | ... |
|---|---|---|---|---|
| Ring | 42 | 50 | 30 | ... |

— 410

Search Results — 400

| | Item Name | Required Level | Remaining Time |
|---|---|---|---|
| 420 | Adventuring Ring | 42 | 15h 57m |
| 430 | Nature's Piece Ring | 42 | 1h 55m |
| 440 | Dwarf Star Ring | 41 | 31h 36m |
| 450 | Raven Frost Ring | 43 | 12h 30m |
| 460 | Connection Ring | 45 | 24h 15m |

GAME ITEM AUCTION

CROSS-REFERENCE TO RELATED APPLICATION

This Application is the National Stage filing under 35 U.S.C. §371 of PCT Application Ser. No. PCT/US12/68460 filed on Dec. 7, 2012. The disclosure of the PCT Application is hereby incorporated herein by reference in its entirety.

BACKGROUND

An MMO (Massively Multiplayer Online) game generally provides an auction house from which players can buy and sell game items such as, for example, weapons, armor, etc. The auction house is an in-game mechanism to facilitate easy trading of game items. When a player wants to sell a game item, the player can just enter a minimum price at which he/she wants bidding to start, and a time limit for the auction (e.g., 12, 24, or 48 hours). Meanwhile, when the player wants to buy some game items, the player can search for game items available via multiple auctions, and bid for one or more of the auctions to get his/her desired game item.

SUMMARY

In an example, an item auction system may include a playing pattern analysis unit configured to analyze a playing pattern of a player of a particular game, a character level prediction unit configured to predict level advancement for a game character of the player based at least in part on the analyzed playing pattern, and an item recommendation unit configured to recommend one or more game items to the player from among multiple game items in one or more auctions based at least in part on the predicted level advancement and time remaining in respective ones of the one or more auctions.

In another example, a method performed under control of an item auction system may include identifying a current level of a character of a player who plays a game associated with the item auction system, predicting a level of the character at an end of an auction for a game item based at least in part on a playing pattern of the player, and recommending the game item to the player based at least in part on the predicted level and a property of the game item.

In yet another example, a computer-readable storage medium may store thereon computer-executable instructions that, in response to execution, cause a game server to perform operations, including predicting level advancement of a game character of a player in a game provided by the game server, and recommending to the player at least some of game items in auctions based at least in part on the predicted level advancement and remaining time for the auctions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 schematically shows an illustrative example of a result of item recommendation, arranged in accordance with at least some embodiments described herein;

DETAILED DESCRIPTION

Figure 1:
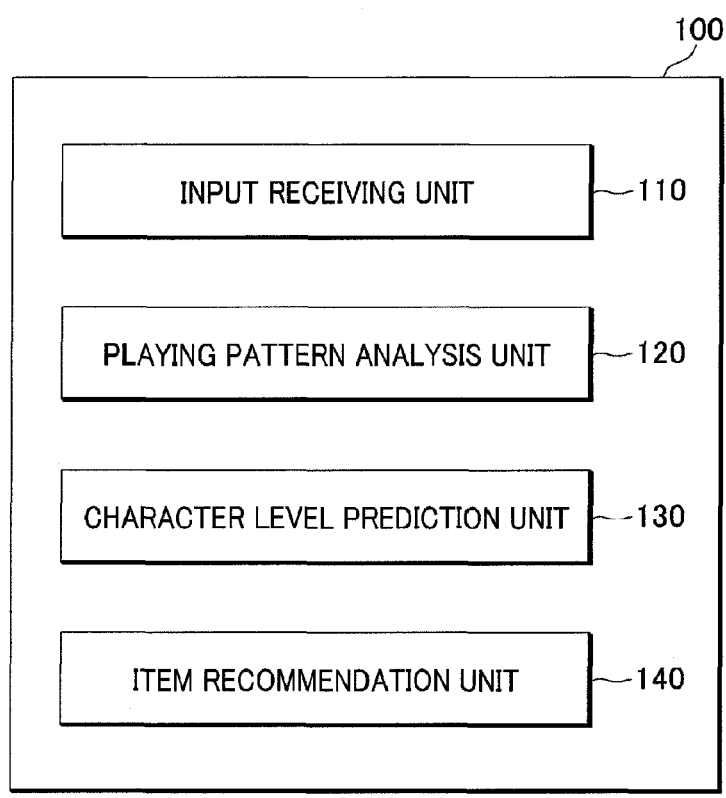
FIG. 1 shows a schematic block diagram illustrating an example architecture of an item auction system, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to an item recommendation scheme for an item auction system. Further, technologies are herein generally described for recommending one or more game items to a player from among multiple game items in one or more auctions based at least in part on a playing pattern of the player.

In some examples, when a player, who plays a game provided by a game server, wishes to buy one or more game items at auction, the player may send the game server a search request including at least one search condition such as, for example, a type of a game item to buy, desired game options (e.g., damage, strength, vitality, cold resistance, etc.) of the game item, and so on. Then, the item auction system may recommend to the player one or more of the multiple game items that satisfy the one or more search conditions in response to the search request received from the player. The item auction system may be operated by the game server. By way of example, but not limitation, the item auction system may be a component of the game server, or may be controlled by one or more segments of a server farm or a server cluster for providing the game to the player.

In some examples, the item auction system may identify a current level of a game character of the player. Further, the item auction system may analyze a playing pattern of the player based at least in part on game playing time of the player. By way of example, but not limitation, the playing pattern of the player may take into consideration an average amount of time the player plays the game in a day, an average amount of time the player plays the game in a week, an average amount of time the player plays the game in a month, an amount of time that the player has spent to reach the current level of the game for the game character, and so on.

Then, in some examples, the item auction system may predict level advancement for the game character of the player, based at least in part on the identified current level of the game character, the analyzed playing pattern of the player, and/or a game design. By way of example, but not limitation, when the game is a role-playing game (RPG), the game design may include a rate of appearance of characters that are hostile to the game character of the player (i.e., hostile characters), and/or experience points to be provided to the player as the game progresses. That is, the game server may design the game to provide the player at a particular game level with a predetermined number of hostile characters and/or predetermined experience points as the game progresses. The player may acquire the experience points by killing the hostile characters and/or completing various missions as part of the game, and may advance to play at a higher level of the game when the experience points exceed a predetermined value. In this regard, taking into consideration the game design, the current level of the game character and the playing pattern of the player, the item auction system may predict when the game character will clear the current level and move on to a higher level, when the game character will clear the higher level and move on to an even higher level, and so on.

In some other examples, the item auction system may predict the level advancement based at least in part on the identified current level of the game character, the analyzed playing pattern of the player, and/or playing patterns of other players. By way of example, but not limitation, it may be assumed that the player has spent a time $T_N$ to reach the current level (e.g., level N) of the game character. In such cases, the item auction system may identify the other players who have also spent $T_N$ to reach level N, and identify an average time $t_N$, which the other players have spent to clear level N and to move on to the higher level (i.e., level N+1). Then, the item auction system may suppose that the game character of the player will also clear level N and move on to level N+1 after the player spends $t_N$ at level N.

Then, in some examples, the item auction system may predict a level of the game character at an end of an auction for a respective one of the multiple game items. The item auction system may then determine whether to recommend the respective one of the game items to the player based at least in part on the predicted level and a required level for applying the respective one of the game items to the game character. By way of example, but not limitation, when the predicted level is equal to or higher than the required level, the item auction system may recommend the respective one of the game items to the player.

Then, in some examples, the item auction system may repeat or iterate, for the other game items at auction, the prediction of the level and the game item recommendations.

Then, the item auction system may select one or more game items to be recommended to the player from among the multiple game items, and recommend to the player a list of the one or more game items.

FIG. 1 shows a schematic block diagram illustrating an example architecture of an item auction system 100, arranged in accordance with at least some embodiments described herein.

Item auction system 100 may be operated or controlled by a game server providing a player with a game. In some embodiments, item auction system 100 may be a component of the game server, or may be controlled or operated by one or more segments of a server farm or a server cluster for providing the game to the player.

As depicted in FIG. 1, item auction system 100 may include an input receiving unit 110, a playing pattern analysis unit 120, a character level prediction unit 130, and an item recommendation unit 140. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Input receiving unit 110 may be configured to receive at least one search condition from the player who plays the game associated with item auction system 100 and decides to buy a game item at auction. By way of example, but not limitation, the search condition may include a type of the game item which the player wants to buy, desired game options (e.g., damage, strength, vitality, cold resistance, etc.) of the game item, and so on.

Playing pattern analysis unit 120 may be configured to analyze a playing pattern of the player. By way of example, but not limitation, the analyzed playing pattern of the player may include an average amount of time the player plays the game in a day, an average amount of time the player plays the game in a week, an average amount of time the player plays the game in a month, an amount of time that the player has spent to reach a current level of the game for a game character of the player, and so on.

Character level prediction unit 130 may be configured to predict level advancement for the game character of the player based at least in part on the playing pattern analyzed by playing pattern analysis unit 120, a game design and/or playing patterns of other players.

In some embodiments, when the game is a role-playing game (RPG), for example, the game design may include a rate of appearance of characters that are hostile to the game character of the player (i.e., hostile characters), and/or experience points to be provided to the player as the game progresses. In such case, as the player spends time to get the experience points by killing the hostile characters and/or completing gaming missions, a playing level for the game character may increase, as illustrated in FIGS. 2A and 2B.

Figures 2A, 2B:
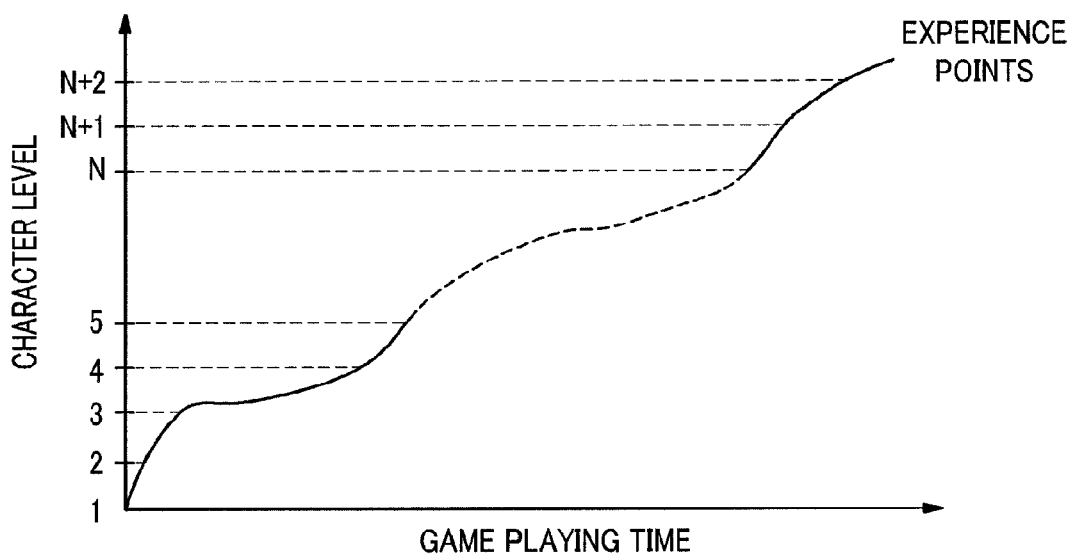
FIG. 2A schematically shows an example diagram illustrating a change in a character's game level with respect to game playing time, arranged in accordance with at least some embodiments described herein.
FIG. 2B schematically shows an example diagram illustrating a change in a character's game level with respect to real time, arranged in accordance with at least some embodiments described herein.

FIG. 2A schematically shows an example diagram illustrating a change in a character's game level with respect to game playing time, and FIG. 2B schematically shows an example diagram illustrating a change in a character's game level with respect to real time, arranged in accordance with at least some embodiments described herein.

As shown in FIG. 2A, experience points, which is a unit of measurement used to quantify the game character's progression through the game, may increase based at least in part on the game design, as the player plays the game. Also, the playing level of the game character may increase as the experience points increase, based at least in part on the game design. However, since the player does not play the game all day long, the experience points and the playing level of the game character may increase as the player actually plays the game (i.e., during log-in periods), as shown in FIG. 2B. That is, the playing level for the game character may increase based at least in part on one or both of the game design and the playing pattern of the player. By way of example, but not limitation, if the game design specifies that x hours of playing time is required to clear a particular level and to move on to a higher level, and the player plays average y hours per day, character level prediction unit 130 may predict that the game character of the player will clear the particular level after playing the game for x/y days.

In some embodiments, character level prediction unit 130 may predict the level advancement based at least in part on the playing patterns of other players for whom time played to reach the current level of the game character is similar to that of the player. By way of example, but not limitation, when the other players have spent, for example, z hours on average to reach a particular level, character level prediction unit 130 may predict that the game character of the player will also reach the particular level after the player plays the game for z hours. By way of another example, but not limitation, when time spent by the other players to reach the particular level follows a normal (Gaussian) distribution, character level prediction unit 130 may predict the level advancement based at least in part on a mean and a standard deviation of the distribution, as will be described in more details with reference to FIG. 3.

Figure 3:
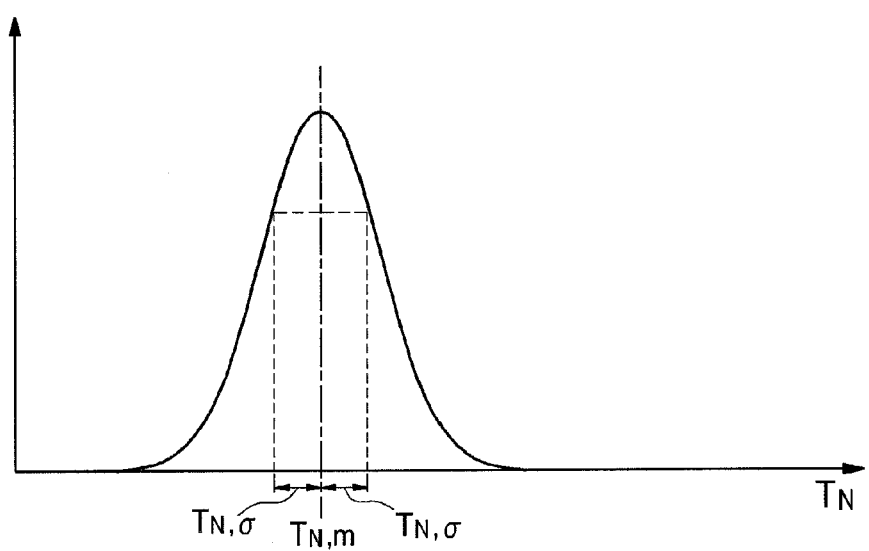
FIG. 3 schematically shows an example diagram illustrating a distribution of game playing time to reach a particular character level to be used for predicting level advancement for a game character, arranged in accordance with at least some embodiments described herein.

FIG. 3 schematically shows an example diagram illustrating a distribution of game playing time to reach a particular character level to be used for predicting level advancement for a game character, arranged in accordance with at least some embodiments described herein.

In some embodiments, the game playing time of the other players (for whom time played to reach the current level of the game character is similar to that of the player) to reach a level N may be distributed in Gaussian fashion as shown in FIG. 3. Assuming that the mean and standard deviation of the distribution in FIG. 3 is $T_{N,m}$ and $T_{N,\sigma}$, respectively, about 68% of the other players may spend time in a time range between $T_{N,m}-T_{N,\sigma}$ and $T_{N,m}+T_{N,\sigma}$ to reach level N, about 95% of the other players may spend time in a time range between $T_{N,m}-2T_{N,\sigma}$ and $T_{N,m}+2T_{N,\sigma}$ to reach level N, about 99.7% of the other players may spend time in a time range between $T_{N,m}-3T_{N,\sigma}$ and $T_{N,m}+3T_{N,\sigma}$ to reach level N, and so on. In this regard, character level prediction unit 130 may predict that the level of the game character will become level N after the player spending time in the time range between $T_{N,m}-T_{N,\sigma}$ and $T_{N,m}+T_{N,\sigma}$ with a 68% probability, $T_{N,m}-2T_{N,\sigma}$ and $T_{N,m}+2T_{N,\sigma}$ with a 95% probability, $T_{N,m}-3T_{N,\sigma}$ and $T_{N,m}+3T_{N,\sigma}$ with a 99.7% probability, and so on.

Although FIG. 3 illustrates that the distribution of game playing time is a normal (Gaussian) distribution, it will be appreciated by those skilled in the art that the distribution of game playing time is not limited to the normal distribution, but may be any other distribution.

Referring back to FIG. 1, item recommendation unit 140 may be configured to recommend one or more game items to the player from among multiple game items via one or more auctions based at least in part on the level advancement predicted by character level prediction unit 130 and time remaining in respective ones of the one or more auctions. In some embodiments, item recommendation unit 140 may also recommend the one or more game items based at least in part on properties of the respective game items such as, for example, respective required levels for applying the respective game items to the game character. That is, item recommendation unit 140 may compare the required level of each of the game items and a level at the end of at least one of the one or more auctions for the corresponding game item predicted by character level prediction unit 130, and recommend to the player one or more of the game items for each of which the required level is less than or equal to the predicted level. Further, in some embodiments, item recommendation unit 140 may recommend the one or more game items that also satisfy the at least one search condition received by input receiving unit 110.

FIG. 4 schematically shows an illustrative example of a result of item recommendation 400, arranged in accordance with at least some embodiments described herein.

In the example of FIG. 4, it may be assumed that the current level of the game character of the player is level 42, and the level advancement of the game character predicted by character level prediction unit 130 is as in the table below.

| Level | Time (in real time) |
|---|---|
| 43 | After 12-13 hours |
| 44 | After 16-18 hours |
| 45 | After 24-26 hours |

Further, it may be assumed that a search condition 410 received by input receiving unit 110 may specify an item type to a ring, a required level to level 42 (i.e., the current level of the player), minimum strength to 50, minimum vitality to 30, as depicted in FIG. 4. In such cases, result 400, which may be provided by item recommendation unit 140, may include game items 420, 430 and 440 that currently satisfy search condition 410. Result 400 may also include game items 450 and 460 that do not satisfy search condition 410 currently, but will satisfy search condition 410 at an end of each of auctions of game items 450 and 460. In some embodiments, character level prediction unit 130 may predict a level of the game character at an end of each of auctions for all available game items except game items 420, 430 and 440 (i.e., currently satisfying search condition 410), and item recommendation unit 140 may compare the predicted level with the required level of each of the available game items, and recommend to the player game items 450 and 460 that will satisfy search condition 410 at the end of each auctions. That is, although the required level for game item 450 (i.e., level 43) is currently higher than the required level specified by search condition 410 (i.e., the current level of the player), the game character may use or wear game item 450 when the auction for game item 450 ends, since the time remaining for the auction for game item 450 is 12 hours 30 minutes while the level of the game character is expected to be level 43 in 12-13 hours. Similarly, although the required level for game item 460 (i.e., level 45) is currently higher than the required level specified by search condition 410 (i.e., the current level of the player), the game character may use or wear game item 460 when the auction for game item 460 ends, since the time remaining for the auction for game item 460 is 24 hours 15 minutes while the level of the game character is expected to be level 45 in 24-26 hours. In this regard, item recommendation unit 140 may show game items 450 and 460 in result 400.

As such, item auction system 100 may allow the player to search more appropriate items at auction, and make a more prompt and/or simple purchase decision.

Figure 5:
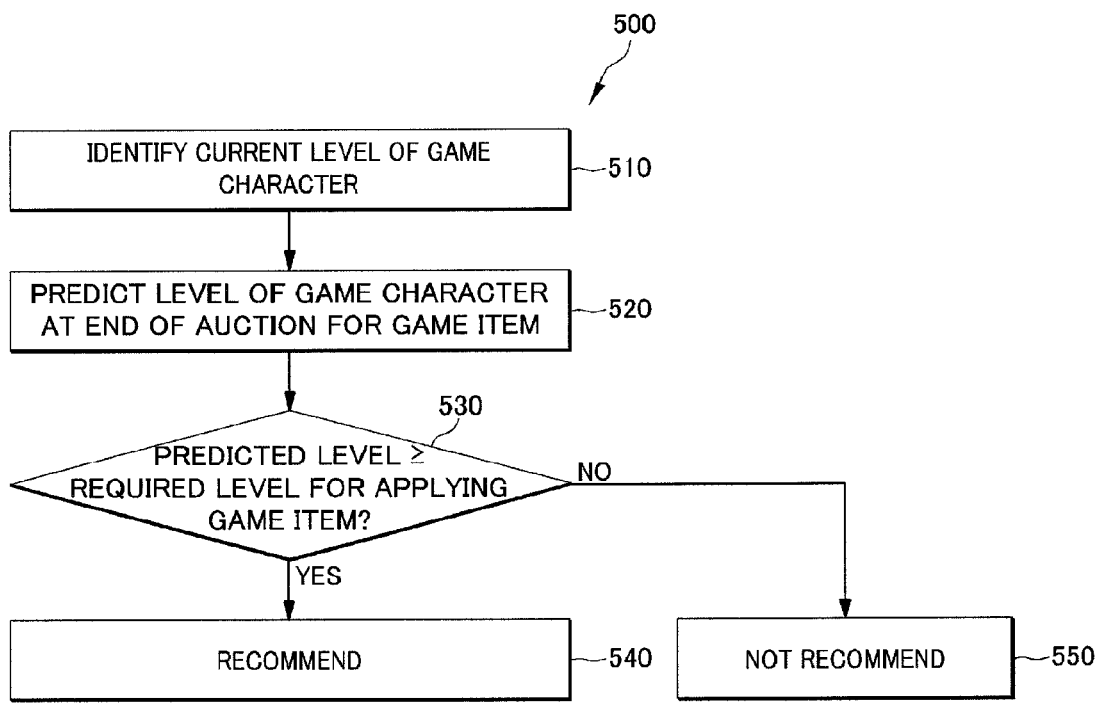
FIG. 5 shows an example flow diagram of a process for providing an item recommendation scheme for an item auction system, arranged in accordance with at least some embodiments described herein.

FIG. 5 shows an example flow diagram of a process 500 for providing an item recommendation scheme for an item auction system, arranged in accordance with at least some embodiments described herein.

Process 500 may be implemented in an item auction system such as item auction system 100 including input receiving unit 110, playing pattern analysis unit 120, character level prediction unit 130 and item recommendation unit 140. Process 500 may include one or more operations, actions, or functions as illustrated by one or more blocks 510, 520, 530, 540 and/or 550. Although illustrated as discrete blocks, various blocks may be divided into additional blocks, combined into fewer blocks, or eliminated, depending on the desired implementation. Processing may begin at block 510.

At block 510 (Identify Current Level of Game Character), item auction system 100 may identify a current level of a game character of a player who plays a game. The game may be associated with item auction system 100. By way of example, but not limitation, a game server providing the player with the game may operate item auction system 100. Processing may continue from block 510 to block 520.

At block 520 (Predict Level of Game Character at End of Auction for Game Item), item auction system 100 (e.g., character level prediction unit 130) may predict a level of the game character at an end of an auction for a game item. In some embodiments, item auction system 100 may predict the level of the game character based at least in part on a playing pattern of the player (e.g., analyzed by playing pattern analysis unit 120), a game design, and/or playing patterns of other players (e.g., analyzed by playing pattern analysis unit 120). By way of example, but not limitation, the playing pattern of the player may include an average amount of time the player plays the game in a day, an average amount of time the player plays the game in a week, an average amount of time the player plays the game in a month, an amount of time that the player has spent to reach the current level of the game for the game character, and so on. Further, by way of example, but not limitation, the game design may include a rate of appearance of hostile characters and/or experience points to be provided to the player as the game progresses, when the game is a role-playing game (RPG). Processing may continue from block 520 to decision block 530.

At decision block 530 (Predicted Level≥Required Level for Applying Game Item?), item auction system 100 (e.g., item recommendation unit 140) may compare the predicted level and a required level for applying the game item to the game character. When the predicted level is equal to or higher than the required level, processing may continue from decision block 530 to block decision 540. Otherwise, processing may continue from decision block 530 to block 550.

At block 540 (Recommend), item auction system 100 (e.g., item recommendation unit 140) may recommend the game item to the player.

At block 550 (Not Recommend), item auction system 100 may not recommend the game item to the player.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
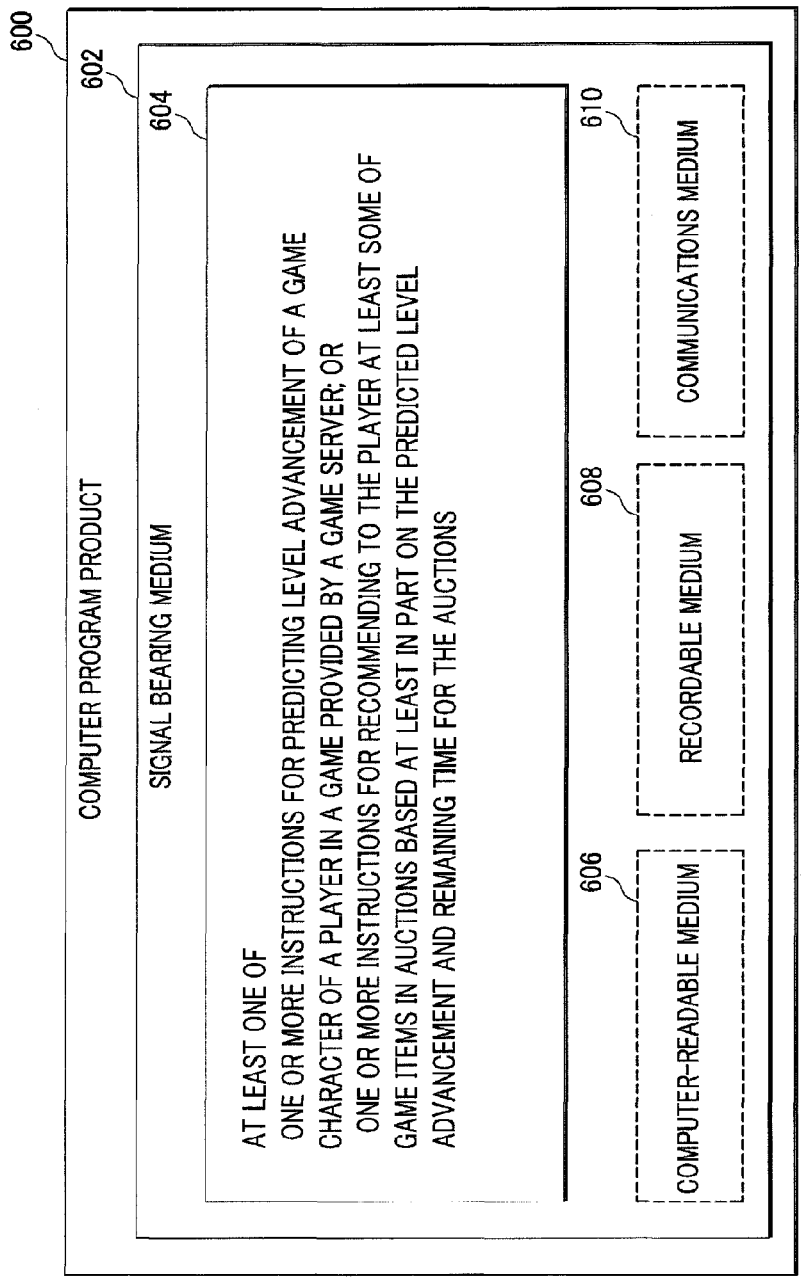
FIG. 6 illustrates an example computer program product that may be utilized to provide an item recommendation scheme for an item auction system, arranged in accordance with at least some embodiments described herein.

FIG. 6 illustrates an example computer program product 600 that may be utilized to provide an item recommendation scheme for an item auction system, arranged in accordance with at least some embodiments described herein.

Program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for predicting level advancement of a game character of a player in a game provided by a game server; or one or more instructions for recommending to the player at least some of game items in auctions based at least in part on the predicted level advancement and remaining time for the auctions. Thus, for example, referring to FIG. 1, item auction system 100 may undertake one or more of the blocks shown in FIG. 5 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of item auction system 100 by an RF signal bearing medium 602, where the signal bearing medium 602 is conveyed by a wireless communications medium 610 (e.g., a wireless communications medium conforming with the IEEE 802.11 standard).

Figure 7:
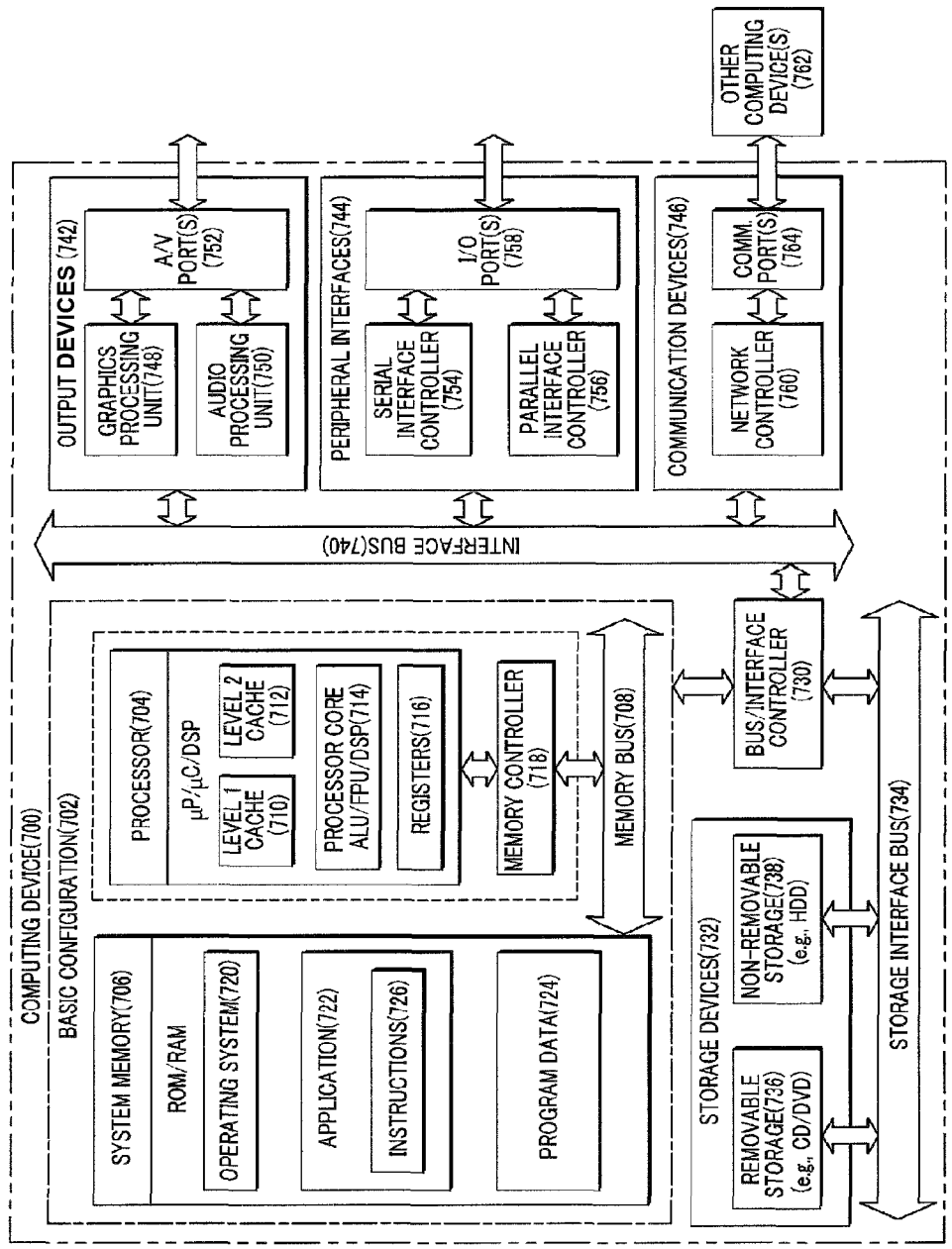
FIG. 7 is a block diagram illustrating an example computing device that may be utilized to provide an item recommendation scheme for an item auction system, arranged in accordance with at least some embodiments described herein.

FIG. 7 is a block diagram illustrating an example computing device 700 that may be utilized to provide an item recommendation scheme for an item auction system, arranged in accordance with at least some embodiments described herein.

In these examples, elements of computing device 700 may be arranged or configured for a server. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include instructions 726 that may be arranged to perform the functions as described herein including the actions described with respect to the item auction system 100 architecture as shown in FIG. 1 or including the actions described with respect to the flow charts shown in FIG. 5. In some examples, application 722 may be arranged to operate with program data 724 on an operating system 720 such that implementations for instructions for a computing system as described herein.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An item auction system configured to be operated by a game server, comprising:
 a playing pattern analysis unit configured to analyze a playing pattern of a player of a particular game being provided by the game server,
  wherein the analyzed playing pattern of the player includes an indication of an amount of time that the player has spent playing the particular game to reach a current level of the game for a game character;
 a character level prediction unit configured to predict level advancement for the game character of the player based at least in part on the analyzed playing pattern; and
 an item recommendation unit configured to recommend one or more game items of the particular game to the player from among a plurality of game items in one or more auctions based at least in part on the predicted level advancement and time remaining in respective ones of the one or more auctions.

2. The item auction system of claim 1, wherein the character level prediction unit is further configured to predict the level advancement of the game character based at least in part on a design of the game being provided by the game server.

3. The item auction system of claim 2, wherein the design of the game being provided by the game server includes at least one of an indication of a rate of appearance of game characters that are hostile to the game character of the player and an indication of experience points to be provided to the player as the game progresses.

4. The item auction system of claim 1, wherein the character level prediction unit is further configured to predict the level advancement further based at least in part on playing patterns of other players for whom time played to reach a current level of the game character is similar to that of the player.

5. The item auction system of claim 1, wherein the item recommendation unit is further configured to recommend the one or more game items based at least in part on respective required levels for applying the respective game items to the game character.

6. The item auction system of claim 5, wherein the required level of each of the recommended game items is less than or equal to a future level at an end of at least one of the one or more auctions for the corresponding game item predicted by the character level prediction unit.

7. The item auction system of claim 1, wherein the item recommendation unit is further configured to provide the player with a list of the one or more recommended game items.

8. The item auction system of claim 1, further comprising:
 an input receiving unit configured to receive at least one search condition from the player,
 wherein the item recommendation unit is further configured to recommend one or more of the game items that satisfy the at least one search condition.

9. The item auction system of claim 1, wherein the item auction system is operated by the game server providing the game to the player.

10. A method performed under control of an item auction system, the item auction system configured to be controlled by a game server, the method comprising:
 identifying a current level of a game character of a player who plays a game being provided by the game server associated with the item auction system;
 predicting a level of the game character of the player at an end of an auction for a game item of the game based at least in part on a playing pattern of the player,
  wherein the playing pattern of the player includes an indication of an amount of time that the player has spent playing the game to reach the current level of the game for the character; and
 recommending the game item to the player based at least in part on the predicted level and a property of the game item.

11. The method of claim 10, wherein the predicting is further based on a design of the game being provided by the game server.

12. The method of claim 11, wherein the design of the game being provided by the game server includes at least one of an indication of a rate of appearance of game characters that are hostile to the game character of the player and an indication of experience points to be provided to the player as the game progresses.

13. The method of claim 10, wherein the predicting is further based on playing patterns of other players for whom time played to reach the current level is similar to that of the player.

14. The method of claim 10, wherein the property of the game item includes an indication of a required level for applying the game item to the game character.

15. The method of claim 14, wherein the recommending includes recommending the game item to the player when the predicted level is equal to or higher than the required level.

16. The method of claim 10, further comprising:
iterating the predicting for a plurality of game items,
wherein the recommending includes:
selecting one or more game items to be recommended to the player from among the plurality of game items, and
recommending to the player a list of the one or more game items.

17. A non-transitory computer-readable storage medium having stored thereon computer-executable instructions that, in response to execution, cause a game server to perform operations, comprising:
predicting level advancement of a game character of a player in a game being provided by the game server,
wherein the predicting includes predicting the level advancement of the game character based on at least one of a playing pattern of the player, a game design, and playing patterns of other players; and
recommending to the player at least some of game items of the game in auctions based at least in part on the predicted level advancement and remaining time for the auctions.

* * * * *